Aug. 6, 1968  R. D. HOUK  3,395,592
VERNIER CONTROL WITH AUTOMATIC RELEASE
Filed Sept. 29, 1966  2 Sheets-Sheet 1
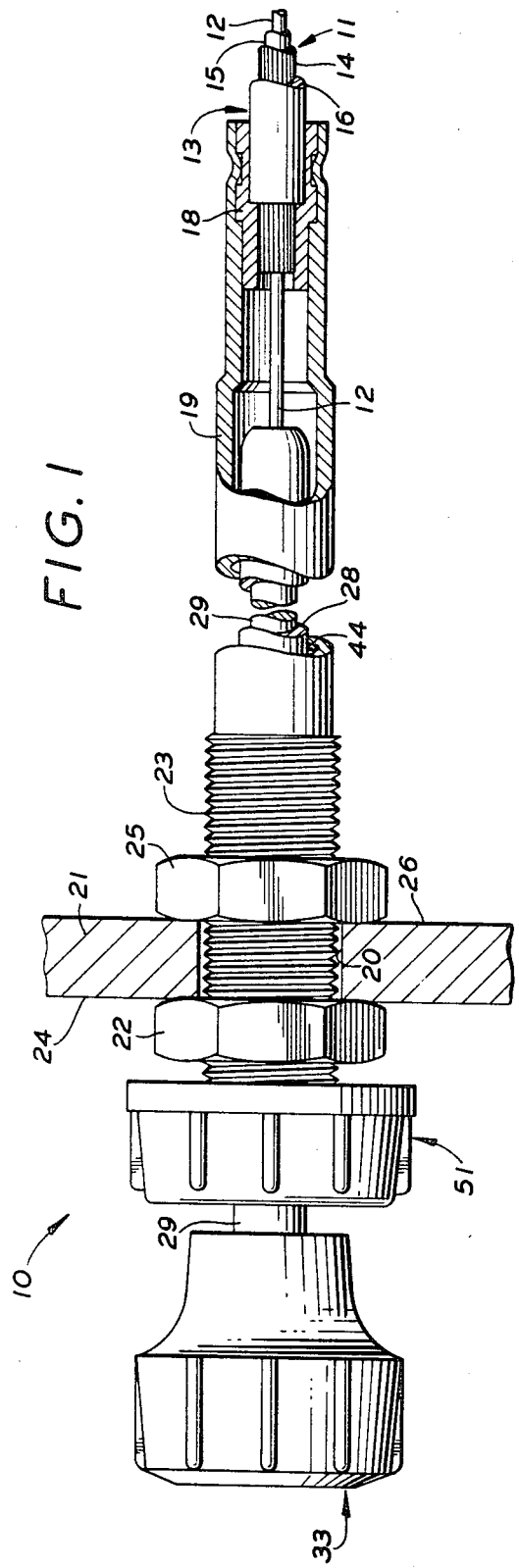
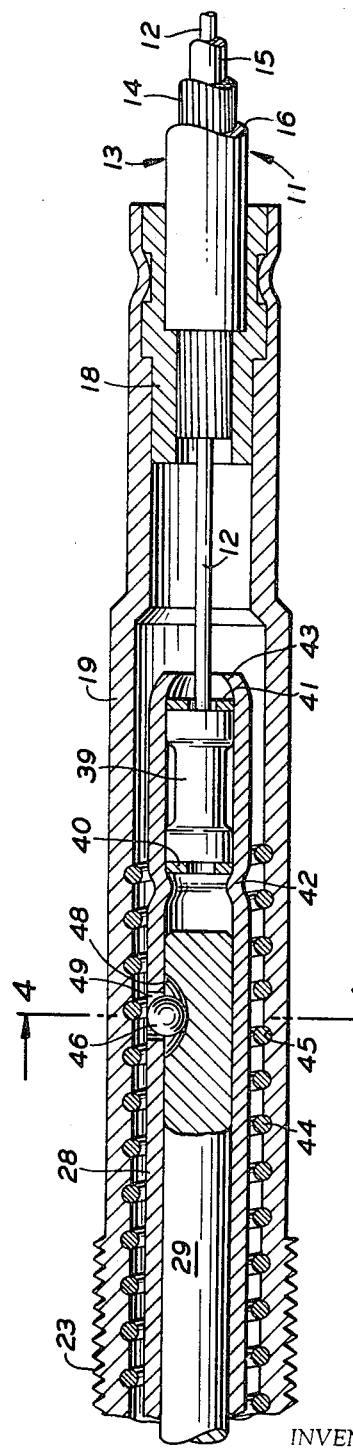
INVENTOR.
RICHARD D. HOUK
BY Hamilton & Cook
ATTORNEYS Aug. 6, 1968  R. D. HOUK  3,395,592
VERNIER CONTROL WITH AUTOMATIC RELEASE
Filed Sept. 29, 1966  2 Sheets-Sheet 2
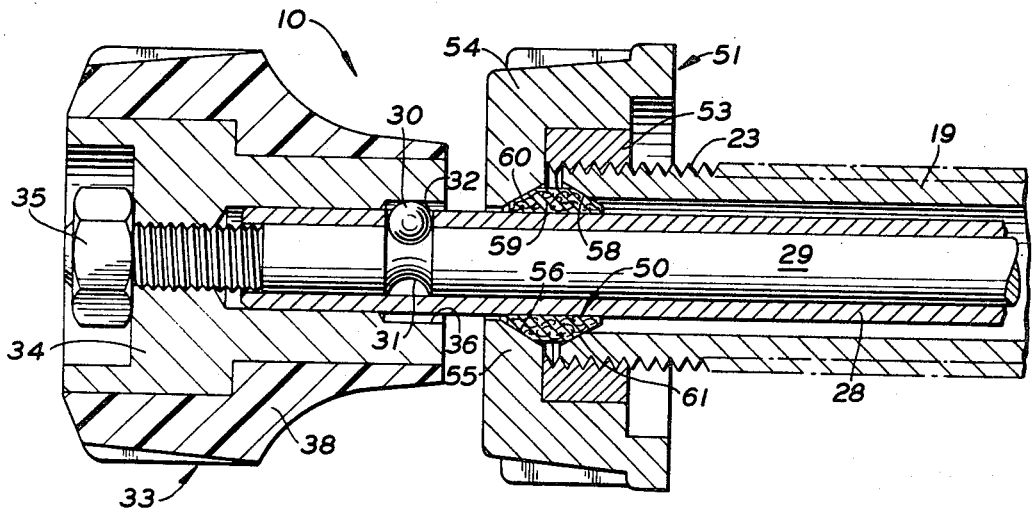
FIG. 3
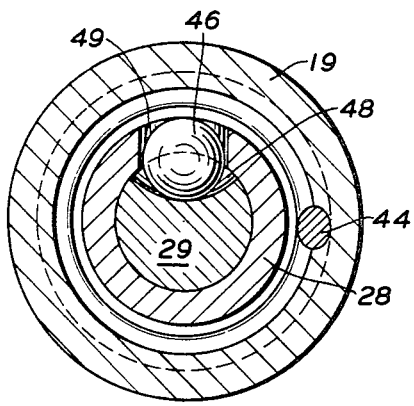 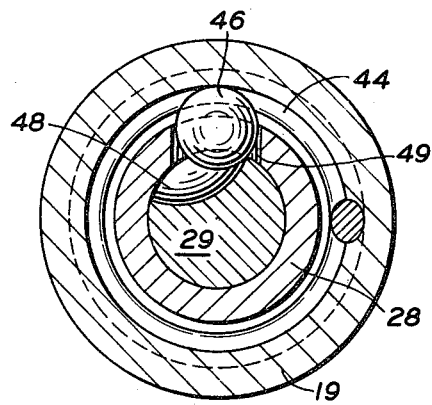
FIG. 4  FIG. 5
INVENTOR.
RICHARD D. HOUK
BY *Hamilton & Cook*
ATTORNEYS

United States Patent Office 3,395,592
Patented Aug. 6, 1968

3,395,592
VERNIER CONTROL WITH AUTOMATIC RELEASE
Richard D. Houk, Stow, Ohio, assignor to Morse Controls Inc., a corporation of Ohio
Filed Sept. 29, 1966, Ser. No. 583,000
8 Claims. (Cl. 74—502)

ABSTRACT OF THE DISCLOSURE

A control device for moving the core of a push-pull control cable axially with respect to the casing thereof in gross amounts and, selectively, in accurately fine, or vernier, increments. The control device has an operating rod, one end of which is connected to the core of a push-pull cable. The other end of the operating rod presents a control knob. The operating rod is slidably received within a housing that is secured to the casing of the control cable. A control sleeve is interposed between the operating rod and the housing for axial movement only simultaneously with the operating rod. The operating rod and the control sleeve are, however, rotatable with, and with respect to, each other. Relative rotation of the operating rod with respect to the control sleeve meshes a thread engaging means with a thread means, and relative rotation of the control sleeve with respect to the operating rod unmeshes the thread engaging means from the thread means. Thus, gross control of the core is effected merely by axial translation of the control knob, and vernier control is effected by rotation of the control knob.

---

The present invention relates generally to controls for push-pull cables. More particularly, the present invention relates to a control device for actuating the core of a push-pull control cable with respect to the casing thereof. Specifically, the present invention relates to a control device for moving the core of a push-pull control cable with respect to the casing thereof in gross amounts, and, selectively, with accurately fine, or vernier, increments.

Push-pull control cables are generally well known to the art as devices capable of transmitting mechanical motion in either direction when at least the ends of the cable casing are satisfactorily clamped in position. Push-pull cables, being flexible, are particularly suitable for installations where the cable is required to extend through a number of bends between a control station and a remote controlled station. Such cables are constructed to have a core slidably received in a supporting casing and are commonly utilized in conjunction with such devices as throttle controls. For many such installations it is imperative that the control be capable of providing not only quick major adjustments in gross but also fine, accurate vernier adjustments.

Heretofore, several known control devices have been employed to provide such a result. The most widely known construction is quite complex in that it requires that the tubular support attached to the cable casing slidably receive a tubular adjusting member attached to the cable core and in which is also slidably received a release rod for positioning a ball-like engaging member into and out of mating engagement with the threaded interior of the tubular support member. A primary control knob is secured to the adjusting member and coaxially receives a secondary control knob secured to the release rod. To make a vernier adjustment the operator need only turn the primary control knob in the appropriate direction. However, for gross adjustment the operator is required to actuate the secondary control knob axially with respect to the primary knob and, while maintaining the secondary control knob actuated against the biasing action of a spring means, move the primary control knob axially in the desired direction.

Under even the most favorable conditions considerable manual dexterity is required to operate such a control. In moments of stress the results can be disastrous.

In order to alleviate the hazards imposed by the requirement of the aforementioned dexterous manipulation, many substitute constructions have been proposed. Exemplary of such proposals is a complex construction which eliminates the secondary control knob. This construction employs a control knob nonrotatably and axially slidably mounted on a tubular adjusting member which interacts with a release rod by a plurality of spring biased, pivotal dogs carried on the tubular adjusting member and engageable between the knob and release rod. For gross control the operator must always apply sufficient pressure to overcome the spring bias and thereafter move the control knob in the desired direction. Accordingly, approximation of incremental adjustments in gross are most difficult, if not impossible, to obtain.

Similarly, another construction utilizes an annularly interrupted spring sleeve embracing a frame sleeve in which an operating rod is slidably received. The spring sleeve biases a ball into engagement with tread means on the exterior of the operating rod. Here too, in gross control can be effected only after sufficient force is applied to the control knob to overcome the pre-loading resistance offered by the spring means to maintain the ball in engagement with the thread means.

It is therefore a primary object of the present invention to provide, for the core of a push-pull control cable, a control device capable of selective gross or vernier adjustments the facile operation of which is totally independent of the personal stress to which the operator is exposed.

It is another object of the present invention to provide a control device, as above, which employs a single control knob and eliminates the necessity for spring biasing means.

It is yet another object of the present invention to provide a control device, as above, which may be converted from vernier to gross adjustment merely by the application of an axial force to the control knob.

It is still another object of the present invention to provide a control device, as above, in which the axial force required to convert from vernier to gross adjustment is selectively variable.

It is a further object of the present invention to provide a control device, as above, which is relatively uncomplex and economical to manufacture and maintain.

These and other objects which will become apparent from the following specification are accomplished by means hereinafter described and claimed.

One preferred embodiment is shown by way of example in the accompanying drawings and described in detail without attempting to show all of the various forms and modifications in which the invention might be embodied; the invention being measured by the appended claims and not by the details of the specification.

In the drawings:

FIG. 1 is a side elevation, partly broken away and partly in section, depicting a push-pull control cable operatively connected to a control device embodying the concept of the present invention;

FIG. 2 is an enlarged cross sectional area of FIG. 1 depicting the connection of the control device to the core and casing of the push-pull control cable as well as that portion of the control device in proximity to said connection;

FIG. 3 is an enlarged cross sectional area of FIG. 1 similar to FIG. 2 but depicting the opposite end of the control device;

FIG. 4 is a cross section taken substantially on line 4—4 of FIG. 2 depicting the thread engaging ball in its radially innermost position, as it would be for gross operation of the control; and, FIG. 5 is a view similar to FIG. 4 except that the thread engaging ball is in its radially outermost position, as it would be for vernier operation of the control.

In general, a control device according to the concept of the present invention has a tubular housing adapted to be connected to the casing of a push-pull control cable. Slidably received within the tubular housing is a control sleeve which is adapted to be connected to the core of a push-pull control cable. The inner surface of the tubular housing is provided with thread means for selective meshing engagement with a ball received in a semispherical recess on the radially outer surface of an operating rod. The operating rod is positioned interiorly of the control sleeve and is movable axially therewith but is both rotatable with and with respect thereto.

The thread engaging ball is movable radially inwardly and outwardly through an aperture in the control sleeve in response to rotation of the operating rod with respect to the control sleeve. A sufficient degree of relative rotation between the operating rod and the control sleeve to cam the ball radially outwardly into engagement with the thread means is assured by the use of a frictional restrictive means between the control sleeve and the tubular housing. It should therefore be seen that when the operating rod is rotated by the control knob mounted thereon vernier control is effected.

However, to accomplish gross control one need only move the knob axially—the reactive forces between the ball, thread means, control sleeve and operating rod causing the ball to move radially inwardly for the axial translation of the operating rod and control sleeve necessary to gross operation.

Referring more particularly to the drawings, the subject control device is indicated generally by the numeral 10 and is depicted as being operatively attached to a push-pull control cable assembly 11. A push-pull control cable assembly 11 includes the core 12 and the casting 13 in which the core is reciprocably slidable.

The prior art knows many casing constructions, one of which is depicted environmentally herein and comprises a plurality of wires 14 contiguously laid in the form of a helical coil about the radially outer surface of an inner, flexible tube 15 which extends the full length of the casing 13. An outer flexible cover 16 encases the coil of wires 14 and extends along the entire casing to within a short distance from the end of the wires 14.

A fitting 18 is fitted over the end of the wires 14 and cover 16 and is securely attached thereto, as by swaging. Connected to the fitting 18, and thereby the cable casing 13, is the tubular housing 19 of the control device 10. The housing 19 of the control device may be directly positioned through a suitable opening 20, for example on instrument panel 21, by supplying a radially extending shoulder, or first mounting nut, 22 and a threaded shank portion 23. The mounting nut 22 would engage the front face 24 of panel 21, and a second mounting nut 25 could be tightened against the rear face 26 of the panel 21 to secure the control device 10 in position.

Slidably received in the tubular housing 19 is a control sleeve 28 which, in turn, embraces an operating rod 29. The control sleeve 28 and the operating rod 29 can be moved axially only in unison, but are rotatable with and with respect to each other. This duality of motion may be accomplished by a thrust ball connection, as best depicted in FIG. 3. A thrust ball 30 is received in an arcuate recess 31 which extends annularly around operating rod 29. The thrust ball 30 also extends outwardly into and fully contacts the periphery of a radial aperture 32 through control sleeve 28. The thrust ball 30 thus maintains the control sleeve 28 and operating rod together for biaxial movement thereof but permits relative rotative movement since the ball 30 can move circumferentially of the operating rod 29 through recess 32.

One end of the operating rod 29 extends axially outwardly of the control sleeve 28 to mount a control knob means 33. As shown, the control knob means may comprise a body portion 34 which is threaded onto the operating rod 29 and secured thereto by a lock nut 35. The body portion 34 may be relieved to provide an annular skirt 36 concentrically outwardly of the control sleeve 28 to retain the thrust ball in engagement with the annular recess 31. A plastic cover 38 may be applied over the body portion 34.

The cooperative control sleeve 28 and operating rod 29 are attached to the core 12 of the push-pull cable assembly 11. Inasmuch as the control sleeve 28 and operating rod 29 will rotate relative to the tubular housing 19 during vernier adjustment, as will be more fully hereinafter described, and the cable core 12 is often attached at the remote controlled station in such a way that rotation thereof would be undesirable, it is preferable that the control sleeve-operating rod assembly be rotatably attached to the core 12. An exemplary construction is depicted in FIG. 2. The end of the cable core 12 is swaged or otherwise affixed to a cylindrical plug 39, and the plug 39 is rotatably received within control sleeve 28. Two positioning washers 40 and 41 engage the ends of the plug 39 and maintain the plug against axial displacement with respect to the control sleeve 28. Washer 40 is retained in position by a dimple crimp 42, and washer 41 is retained by end crimp 43.

To allow critical vernier adjustment a thread means is provided on the interior surface of the tubular housing 19. The thread means depicted comprises a helically wound coil of polished wire 44 which is seated in a helical groove 45 of substantially semiannular cross section on the inner surface of the tubular housing 19. A thread engaging ball 46 received in a semispherical recess 48 in the radially outer surface of the operating rod 29 is movable radially inwardly and outwardly through a radial aperture 49 in the control sleeve 28. When the ball 46 is in the radially innermost position, as depicted in FIG. 4, the control device 10 is adapted for gross operation; however, relative rotation of operating rod 29 with respect to the control sleeve 28 causes the semispherical recess 48 to cam the ball 46 radially outwardly through the aperture 49 in sleeve 28 meshingly to engage the helically wound wire 44. Because the wire 44 presents a helically extending ridge of semicircular cross section, the ball 46 will roll, or slide, easily into a position between successive wraps of the helical wind even though the ball may have initially contacted the radially innermost portion of the wire 44. With prior known constructions, to change from gross to vernier operation the control often had to be jockeyed so that the thread and thread engaging means would properly mesh.

The relative rotation between the control sleeve 28 and the operating rod 29 necessary to change from gross to vernier operation may be effected simply by rotation of the control knob means 33 inasmuch as a restrictive means 50 retards rotation of the control sleeve 28. As shown in FIG. 3, a compression nut 51 engages the tubular housing 19 by threads 23 outwardly of mounting nut 22. The nut 51 may be unitary or may, as shown, comprise a threaded metallic grommet member 53 fixedly received within a cap portion 54. In either event the compression nut 51 has a radially inwardly directed neck portion 55 which lies concentrically of the control sleeve 28. That side of the neck portion 55 facing the housing 19 flares radially outwardly to form a throat 56. A similar throat 58 on the adjacent end of the housing 19 opposingly faces the throat 56.

An annular friction collar 59 slidably engages the sleeve 28 between throats 56 and 58 and is preferably provided with conically tapered edges 60 and 61 matingly engageable by throats 56 and 58, respectively. By varying the axial position of the compression nut 51 the collar 59 applies a corresponding variation of the frictional engagement between the control sleeve 28 and the tubular housing 19.

The restrictive means 50 thus not only affords the relative rotational movement between the operating rod 29 and the control sleeve 28 necessary for the conversion from gross to vernier adjustment merely upon rotation of the control knob 33 but also prevents creepage and accidental sudden changes to the selected setting. On the other hand the restrictive means 50 allows instantaneous conversion from vernier to gross control merely by the application of an axial force to the control knob 33. If, for example, the control device has the ball 46 in the radially outermost position (FIG. 5) for effecting vernier adjustment and gross adjustment is desired, the operator need only push or pull the knob 33 to effect gross adjustment. The interaction of the ball 46 with the ridgelike thread means 44 causes the ball 46 to cam the control sleeve 28 rotationally with respect to the operating rod 29, allowing the ball 46 to drop into the spherical recess 48 for gross operation of the control.

The instantaneous conversion from vernier to gross operation merely by the application of a selectively variable axial force to the control knob and the simplicity of converting from gross to vernier operation merely by rotating the control knob in a device which is so uncomplicated and economical to produce accomplishes the objects of the invention.

What is claimed is:

1. A vernier control device for a push-pull control cable, said control cable having a core and casing, said control device comprising a tubular housing secured to said control cable casing, thread means on the interior of said tubular housing, a control sleeve slidably received in said tubular housing, said control sleeve operatively secured to said cable core, an operating rod interiorly of said control sleeve, said operating rod being movable axially with said control sleeve and being both rotatable with and with respect to said control sleeve, thread engaging means movable radially of said control sleeve into and out of engagement with the thread means on the interior of said tubular housing, actuating means for camming said thread engaging means radially of said control sleeve in response to rotation of said operating rod and restrictive means to retard free rotation of said control sleeve with respect to said tubular housing.

2. A vernier control device, as set forth in claim 1, in which the thread engaging means comprises a ball movable radially through an aperture in said control sleeve.

3. A vernier control device, as set forth in claim 1, in which the actuating means comprises a generally semispherical recess in the radially outer surface of said operating rod.

4. A vernier control, as set forth in claim 1, in which the restrictive means comprises a friction collar adjustably positionable between said control sleeve and said tubular housing.

5. A vernier control, as set forth in claim 1, in which the operating rod is secured to the control sleeve by a thrust ball, said thrust ball engaging an arcuate recess in, and extending annularly around, said operating rod and a radially positioned aperture in said control sleeve.

6. A vernier control, as set forth in claim 1, in which the thread means on the interior of the tubular housing is a helically extending ridge of semicircular cross section and in which the thread engaging means comprises a ball received in a semispherical recess in the radially outer surface of the operating rod which is movable radially inwardly and outwardly through a first radial aperture in said control sleeve in response to rotation of said operating rod with respect to said control sleeve.

7. A vernier control, as set forth in claim 6, in which a thrust ball engages an arcuate recess in, and extending annularly around, said operating rod and a second radial aperture in said control sleeve.

8. A vernier control, as set forth in claim 7, in which a friction collar is adjustably positionable between said control sleeve and said tubular housing by a compression nut carried on said housing.

References Cited

UNITED STATES PATENTS

| | | |
|---|---|---|
| 651,706 | 6/1900 | Forbes. |
| 1,911,540 | 5/1933 | Weatherhead _____ 74—502 |
| 1,429,940 | 9/1922 | Field _____ 74—503 X |
| 2,134,756 | 11/1938 | Gerry _____ 74—502 |
| 2,273,334 | 2/1942 | Shakespeare _____ 74—503 |
| 2,559,197 | 7/1951 | Norton et al. _____ 74—503 |
| 2,640,242 | 6/1953 | Weimer. |

FOREIGN PATENTS

| | | |
|---|---|---|
| 582,158 | 11/1946 | Great Britain. |
| 728,081 | 4/1955 | Great Britain. |

FRED C. MATTERN, JR., *Primary Examiner.*

C. F. GREEN, *Assistant Examiner.*